United States Patent Office 3,208,943
Patented Sept. 28, 1965

3,208,943
COPOLYMERS OF ALKENYL PHOSPHORUS ESTERS AS LUBRICATING OIL ADDITIVES
Peter Kirby, Kelsall, England, assignor to Shell Oil Company, New York, N.Y., a corporation of Delaware
No Drawing. Filed Aug. 30, 1961, Ser. No. 134,857
Claims priority, application Great Britain, Oct. 27, 1960, 36,950/60
2 Claims. (Cl. 252—49.8)

This invention relates to lubricating compositions containing ashless polymeric additives and to the additives themselves, particularly additives that improve the load carrying capacity of lubricating oils, and more particularly poly-functional additives that improve not only the load carrying capacity, but also one or more other properties, e.g., the viscosity/temperature characteristics and the detergency of lubricating oils.

According to the present invention, lubricating oil compositions are provided which comprise a major portion of a lubricating oil and a minor proportion of a copolymer of (A) an alkenyl substituted organic phosphorus compound and (B) a polymerizable unsaturated ester which contains an oil-soluble hydrocarbyl radical of at least 8, preferably 12 to 30 carbon atoms.

A further feature of the present invention is the provision of novel oil-soluble copolymer of an alkenyl substituted organic phosphorus compound containing a phosphinylidyne group and a $C_{8-18}$ alkyl methacrylate. The term "phosphinylidyne group" is to be construed throughout the present specification as meaning $\equiv P \rightarrow O$ group (cf. Jour., Chem. Sec., 1952, page 5125).

The alkenyl-substituted organo-phosphorus compounds containing a phosphinylidyne group of (A) may be derived from phosphoric acid, phosphonic acid, phosphinic acid or phosphine oxide. Thus a very suitable class of phosphorus compounds is that have the general formula:

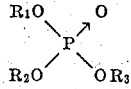

wherein at least one of the groups $R_1$, $R_2$, and $R_3$ is an alkenyl or cycloalkenyl radical, and the other group(s) is (are) hydrogen, or an unsubstituted alkyl, cycloalkyl, aryl, aralkyl or alkaryl radical. The alkenyl radical may be $\alpha{:}\beta$-mono-olefinically unsaturated hydrocarbon radicals, e.g., vinyl or $\alpha$- or $\beta$-alkyl substituted vinyl radicals, but preferably are $\beta{:}\gamma$ mono-olefinically unsaturated hydrocarbon radicals of the formula —$CR'_2$—$CR'$=$CR'_2$, where R' is a hydrogen atom or an alkyl group preferably having no more than 6 carbon atoms. The alkenyl radicals may be the same or different, but are preferably the same, if a di- or trialkenyl derivative is desired, and more preferably they are allyl radicals. Alkenyl esters of phosphoric acid may be prepared by any method well-known in the art. For example, the vinyl type esters may be prepared by dehydrohalogenation of compounds of the formula $(XCH_2CH_2O)_n$—$(RO)_{3-n}P \rightarrow O$, where X is a halogen, which compounds may be themselves prepared by reacting phosphorus/halogen compounds with ethylene oxide.

The allyl type esters can be prepared by reacting the desired phosphorus/halogen compound with a $\beta{:}\gamma$ mono-olefinically unsaturated alcohol in the presence of an acid-sequestrant, e.g., pyridine. Examples of suitable phosphoric acid esters are allyl dihydrogen phosphate, dibutyl allyl phosphate, diethyl allyl phosphate, diallyl hydrogen phosphate, diallyl methy phosphate, diallyl butyl phosphate, diallyl phenyl phosphate, diallyl cyclohexyl phosphate, allyl methallyl hydrogen phosphate, divinyl hydrogen phosphate, divinyl phenyl phosphate, bis(2-ethylallyl)hydrogen phosphate, dimethallyl benzyl phosphate, dicrotyl hydrogen phosphate, bis(2-pentenyl)hydrogen phosphate, bis(2-hexenyl)isopropyl phosphate and triallyl phosphate.

A further class of phosphorus compounds useful as monomers in the present invention is that having the general formula:

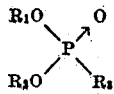

where at least one of the groups $R_1$, $R_2$ and $R_3$ are alkenyl or cycloalkenyl groups and the other group(s) is (are) hydrogen, or an unsubstituted or substituted alkyl, cycloalkyl, aryl, alkaryl, or aralkyl radical. Preferably $R_3$ at least should be an alkenyl or cycloalkenyl radical. The alkenyl radicals may be $\alpha{:}\beta$ mono-olefinically unsaturated hydrocarbon radicals, e.g., vinyl or $\gamma$ or $\beta$-alkyl substituted vinyl radicals, but preferably the alkenyl radicals are $\beta{:}\gamma$ mono-olefinically unsaturated hydrocarbon radicals of the formula —$CR'_2$—$CR'$=$CR'_2$, where R' is a hydrogen atom or an alkyl group preferably having up to six carbon atoms. The alkenyl radicals may be the same or different but are preferably the same, if a di- or tri-alkenyl derivative is desired, more preferably they are allyl radicals. The above alkenyl derivatives of phosphonic acid may be prepared by any of the methods well-known in the art. For example, if $R_1$ and $R_2$ are both alkenyl radicals, the dialkenyl phosphonates may be conveniently prepared by reacting the desired phosphonic dihalide with the desired mono-olefinically unsaturated alcohol in the presence of an acid-sequestrant, e.g., pyridine, to produce the diester. When $R_2$ and $R_3$ are alkenyl radicals, the desired compounds may be prepared by an Arbuzov reaction on a dialkyl alkenyl phosphite with an alkenyl halide. Where $R_3$ is the only alkenyl radical present, the required compound may be prepared by reacting the phosphorus trichloride with an alkanol to produce a trialkyl phosphite which may then be reacted with an alkenyl halide to produce the required mono-alkenyl derivative.

Examples of suitable alkenyl derivatives of phosphonic acid are diethyl allylphosphonate, allyl butyl hydrogenphosphonate, allyl phenylphosphonic acid, diallyl phenylphosphonate, diallyl ethylphosphonate, diallyl butylphosphonte, divinyl ethylphosphonate, the mono-allyl ester of allylphosphonic acid, allyl methallyl phenylphosphonate, dicrotyl hydrogenphosphonate, diallyl benzylphosphonate, divinyl phenylphosphonate, di(2-pentenyl)ethylphosphonate, and diallyl allylphosphonate.

A further class of alkenyl phosphorus monomers that may be used in forming the copolymers of the present invention is that having the general formula:

where at least one of the groups $R_1$, $R_2$ and $R_3$ are alkenyl or cycloalkenyl and the other group(s) is(are) hydrogen or an unsubstituted or substituted alkyl, cycloalkyl, aryl, aralkyl or alkaryl radical. Preferably $R_1$ at least is an alkenyl or cycloalkenyl radical. The alkenyl radicals may be $\alpha{:}\beta$ mono-olefinically unsaturated hydrocarbon radicals, e.g., vinyl or $\alpha$- or $\beta$-alkyl substituted vinyl radicals, but preferably the alkenyl radicals are $\beta{:}\gamma$ mono-olefinically unsaturated hydrocarbon radicals of the formula —$CR'_2$—$CR$=$CR'_2$, where R' is a hydrogen atom or an alkyl group preferably having up to six carbon atoms. The alkenyl radicals may be the same or different but are preferably the same where a di- or trialkenyl derivative is desired, more preferably they are allyl radicals. The above alkenyl derivatives of phosphinic acid may be readily prepared by any of the methods known in the art.

If $R_1$ is alkenyl the $\beta:\gamma$ mono-olefinically unsaturated derivatives may be prepared by direct esterification of a phosphinic acid with the desired $\beta:\gamma$ mono-olefinically unsaturated alcohol. Alternatively, if $R_1$ is alkenyl and a dialkenyl derivative is desired having both alkenyl radicals the same, a convenient method of preparation is to react a phosphonous dichloride with the desired $\beta:\gamma$ mono-olefinically unsaturated alcohol to form the diester of a phosphonous acid which undergoes an Arbuzov rearrangement to form the ester of the corresponding phosphinic acid which may be separated from the reaction mixture by distillation.

If $R_2$ and $R_3$ are alkenyl radicals, the desired product may be obtained by reacting the dialkenyl phosphinous halide with a suitable alcohol or phenol in the presence of an acid sequestrant, e.g., dimethyl aniline. Examples of alkenyl derivatives of phosphinic acid are allyl phosphinate, the allyl ester of phenylethylphosphinic acid, the allyl ester of phenyl allyl phosphinic acid, the allyl ester of allyl phosphinic acid, the vinyl ester of vinylphenylphosphinic acid, diallyl phosphinic acid, allyl phenylphosphinic acid, allylmethallylphosphinic acid, ethyl diallylphosphinate, phenyl allylphosphinate, methyl allylmethallylphosphinate and allyl diallylphosphinate.

A still further class of alkenyl phosphorus compounds useful in the present invention is that having the general formula:

where at least one of $R_1$, $R_2$ and $R_3$ are alkenyl or cycloalkenyl radicals and the other group(s) is(are) hydrogen or an alkyl, cycloalkyl, aryl, aralkyl, or alkenyl radicals may be $\alpha:\beta$ mono-olefinically unsaturated hydrocarbon radicals, e.g., vinyl or $\alpha$- or $\beta$-alkyl substituted vinyl radicals, but preferably are $\beta:\gamma$ mono-olefinically unsaturated hydrocarbon radicals of the formula

where R' is a hydrogen atom or an alkyl preferably having up to six carbon atoms. The alkenyl radicals may be the same or different, but preferably they are the same if a di- or tri-alkenyl derivative is desired and more preferably they are allyl groups. Such phosphine oxides may readily be prepared by the reaction between a mono- or dihalophosphine or phosphorus trichloride and the desired alkenyl Grignard reagent followed by air oxidation. Alternatively, such compounds may be prepared by reacting a compound of the formula $R_nRX_{3-n}$, where R is aryl or alkyl or alkenyl and $n$ is 1 or 2, with sulfur dioxide and chlorine to produce $R_nP(O)X_{3-n}$, and then reacting this product with alkenyl Grignard reagent. Exemplary of suitable phosphine oxides are allyl butyl phenyl phosphine oxide, diallyl p-methoxyphenyl phosphine oxide, diallyl phenyl phosphine oxide, diallyl sec-butyl phosphine oxide, divinyl phenyl phosphine oxide, diallyl butyl phosphine oxide, diallyl benzyl phosphine oxide, diallyl chlormethyl phosphine oxide, allyl methallyl phenyl phosphine oxide, dimethallyl phenyl phosphine oxide, dimethallyl idopropyl phosphine oxide and triallyl phosphine oxide.

Mixtures of two or more of the foregoing monomers can be used if desired. Where it is desired to include the oleophilic hydrocarbon chain of at least 8 carbon atoms in the phosphorus containing monomer, this can readily be done for example, by a reacting compound having the formula $(RO)(A)P(O)H$ where A may be aryl, alkyl, alkoxy, aroxy or hydrogen, and R is alkyl or aryl, with an olefin having at least 8 carbon atoms in the presence of a free radical initiator. The product can then be transesterified to replace the alkoxy or aroxy group(s) by alkenoxy group(s).

The polymerizable compounds of (B) include esters of unsaturated alcohols or acids having at least an 8 carbon, preferably a 12–18 chain in the molecule such as esters of unsaturated alcohols (vinyl or allyl) and saturated $C_{8-20}$ aliphatic carboxylic acids such as vinyl decanoate, vinyl laurate, vinyl tridecanoate, vinyl myristate, vinyl pentadecanoate, vinyl palmitate, vinyl margarate, vinyl stearate, vinyl nonadecanoate, vinyl arachidate, vinyl behenate, vinyl 4,5,6-trimethyldodecanoate, vinyl 6,8,10-triethyl tridecanoate, vinyl 12-hydroxystearate, vinyl 9,10-dihydroxystearate, vinyl chlorostearate, vinyl cyanostearate, vinyl acetylstearate, allyl palmitate or esters of saturated alcohols and unsaturated acrylic acids such as $C_{8-30}$ alkyl acrylate or methacrylate, e.g., decyl acrylate, lauryl acrylate, stearyl acrylate, decyl methacrylate, lauryl methacrylate, cetyl methacrylate, stearyl methacrylate, eicosanyl acrylate, docosanyl acrylate and the like, and mixtures thereof. Mixtures of monomers (B) may be used in preparing the copolymers of this invention to which may be also incorporated a small amount (5–30% of the total polymer) of an acrylate ester of an acrylic acid and a $C_{1-4}$ alkanol and mixtures of esters containing a $C_{8-30}$ alkyl group may be used. Illustrative examples of such mixed esters include decylmethacrylate/octadecyl methacrylate; tetradecyl methacrylate/hexadecyl methacrylate; tetradecyl acrylate/octadecyl methacrylate; dodecyl methacrylate/eisonsanyl acrylate; vinyl laurate/vinyl stearate and the like.

When mixtures of higher acrylate esters are used, it is highly desirable to have a substantial difference in the number of carbon atoms of the alcohol portion. Particularly superior results are obtained when one of the acrylate esters if a $C_{10}$ to $C_{14}$ acrylate ester and the other is a $C_{16}$ to $C_{20}$ acrylate ester.

In the mixtures, the different long chain acrylate esters are employed in mol ratios from 1:4 to 4:1. The superior copolymers are obtained when the higher ester, e.g., those having from 10 to 20 carbon atoms in the alcohol portion, and the lower esters, e.g., those having from 10 to 14 carbon atoms in the alcohol portion are combined in a mol ratio varying from 1:1 to 1:3.

If desired the copolymers of the present invention can be modified by replacing 5–20% of the polymerizable ester (B) with other polymerizable mono-olefinic phosphorous-free compounds having an oleophilic hydrocarbon chain of at least 8 carbon atoms such as vinyl ethers such as vinyl octyl ether, vinyl lauryl ether, vinyl dicresyl ether, vinyl ketones such as octyl vinyl ketone, lauryl vinyl ketone, and stearyl vinyl ketone, vinyl aryl compounds such as orthooctyl styrene, para-lauryl styrene, para-stearyl styrene, para-octyl styrene and other alkyl derivatives of styrene in which a $C_{8-18}$ alkyl group or groups may be substituted in the ring or in the side chain or both; alpha, beta-unsaturated polycarboxylic acids and their derivatives such as maleic, fumaric, citraconic, itaconic, crotonic, aconitic and tricarballylic acids and their mono-polyesters with aliphatic and aromatic alcohols, and their amides and nitriles, may also be used or $\alpha$-olefins particularly those having more than 8 and preferably 12–20 carbon atoms, e.g., $\alpha$-octadecene; amino-substituted olefins, e.g., p-($\beta$-dioctylaminoethyl)styrene and nitrogen-containing heterocyclic compounds having a mono-olefinically unsaturated substituent, e.g., the vinyl pyridines (whether 2, 3- or 4-substituted) such as vinyl $C_{8-18}$ alkyl pyridine, 3-lauryl-5-vinyl pyridine, 4-stearyl-2-vinyl pyridine and 2-stearyl-5-vinyl pyridine. Vinyl lactams are also suitable monomers, particularly the N-vinyl pyrrolidones or N-vinyl piperidones. These vinyl compounds should have at least one $C_{8-15}$ alkyl radical in the molecule.

The molar ratio of phosphorus containing monomer (A) to the polymerizable ester (B) may vary within wide limits and generally between 20:1 and 1:20. Preferably the ratio lies between 1:1 and 1:20, with ratios between 1:3 and 1:10 being especially suitable, of which 5–20% of the polymerizable ester (B) may be replaced with any of the above mentioned phosphorous-free polymerizable compounds, e.g., vinyl octylether, substituted vinyl pyridine or pyrrolidone, e.g., 4-stearyl-2-vinyl pyridine.

The copolymers of the invention can be prepared by any suitable means. Normally the reactants are copolymerized in the presence of a catalyst. Oxygen-yielding catalysts, such as organic peroxides, may be used. These may be aliphatic, aromatic, heterocyclic, or alicyclic peroxides, such as diethyl peroxide, tertiary butyl hydroperoxide, di(tertiary butyl)peroxide, benzoyl peroxide, dimethyl thienyl peroxide, dilauroyl peroxide and urea peroxide. Other catalysts include sodium bisulphite, diethyl sulphoxide, ammonium persulfate, alkali metal perborates and azo compounds, e.g., azo-(bis-isobutyro)nitrile. The catalysts are generally used in an amount of 0.1 to 5% by weight of the reactants.

The copolymerization reaction may be carried out under a variety of conditions. For example, the reaction can be carried out in the presence or absence of an inert solvent, such as a hydrocarbon, under a blanket of nitrogen or carbon dioxide and at a temperature varying from room temperature or lower to about 180° C. or higher for a period of from about 2 to 48 hours. In general the copolymers have a molecular weight in the range of from 25,000 to 1,000,000, preferably in the range of from 50,000 to 400,000.

The following examples illustrate the production of copolymers of the present invention.

EXAMPLE I

A solution of 277 g. of allyl alcohol, 326 g. pyridine and 280 ml. of ether was cooled to approximately −30° C. by means of a bath of IPA/CO$_2$ and was then added to a solution of 255 g. phosphorus oxychloride in 132 ml. ether over a period of two hours. After the first hour a further 100 ml. of ether was added to facilitate stirring. The reaction mixture was stirred for a further three hours after which time the pyridinium chloride formed with filtered off. The filtrate was evaporated leaving triallylphosphate as a clear yellow oil.

51 g. of the triallylphosphate was dissolved in 100 mls. of IMS and refluxed with 100 mls. of 5 N aqueous solution hydroxide for two hours. The solvents were then removed under reduced pressure (100° C./15 mm.) and the residual oil was extracted with ether in order to remove unhydrolysed phosphate. The oil was then treated with dilute hydrochloric acid until acid and the oil thus separated was extracted with ether to produce diallyl hydrogen phosphate.

A mixture of 3.4 g. of the diallyl hydrogen phosphate and 25 g. of lauryl methacrylate in 15.5 g. of technical white oil and 20 ml. of benzene was treated with 0.5 g. benzoyl peroxide and treated at 70° C. for 18 hours with stirring. The benzene was then evaporated to leave the copolymer in a solution of white oil. The molecular ratio of the diallyl hydrogen phosphate to lauryl methacrylate in the copolymer was 1:6.

EXAMPLE II

Phenylphosphonous dichloride was prepared by refluxing together 525 mls. phosphorus trichloride, 468 mls. benzene and 300 g. of aluminum chloride for four hours. Phosphorus oxychloride (223 mls.) was then added and the mixture briefly refluxed. Excess benzene and phosphorus trichloride was evaporated under vacuum and the residue cooled to about 40° C. and extracted with ligroin. From the extract, crude phenylphosphonous dichloride was removed and purified by redistillation under reduced pressure.

A solution of 60.5 g. of allyl bromide in 285 ether was added dropwise to 12 g. magnesium in 100 mls. ether. After stirring for 1 hour, 23 g. of phenylphosphonous dichloride in 100 mls. of ether was added and the mixture stirred overnight. A solution of 50 g. of ammonium chloride in 250 mls. water was added and the ethereal layer was separated, dried over sodium sulfate and evaporated.

The resultant crude diallylphenylphosphine was purified by redistillation. All these operations were conducted in a nitrogen atmosphere.

5.5 g. of the diallylphenylphosphine was dissolved in 12 mls. of benzene and air passed through the solution for thirty minutes to produce diallyl phenyl phosphine oxide. To this solution was added 23 ml. benzene, 15 g. of technical white oil, 7 g. of lauryl methacrylate and 0.5 g. of benzoylperoxide. The mixture was heated to 75° C. and stirred for 24 hours. At the end of each of the first three hours, a further amount of 7 g. lauryl methacrylate was added and with the third addition, a further 0.5 g. of benzoyl peroxide was added. The benzene was evaporated at reduced pressure and the residue heated at 100° C./1 mm. Hg for 30 minutes. The resulting copolymer solution of diallyl phenyl phosphine oxide and lauryl methacrylate in technical white oil was soluble in mineral oil. The molecular ratio of diallyl phenyl phosphine oxide to lauryl methacrylate was 1:4.

EXAMPLE III

Phenyl phosphonous dichloride (prepared as in Example II, 90 g.) was dissolved in carbon tetrachloride (500 ml) and the whole cooled to −50° C. by a Cardice/IPA coolant. Dry chlorine gas was now bubbled into the solution until the exothermic reaction was complete. The product was filtered whilst cool to give a residue of phenyl phosphonic tetrachloride. Further quantities of this material was obtained by evaporation of the mother liquors. The product was purified by recrystallization from carbon tetrachloride, followed by drying in a vacuum desiccator.

Phenyl phosphonic tetrachloride (63 g.) was dissolved in benzene (250 ml.) and the stirred mixture treated with sulfur dioxide until reaction was complete. The reaction is rapid and the phenyl phosphonic dichloride, Ph.POCl$_2$ produced was recovered by distillation B.P. 87° C./1mm. Hg. Phenyl phosphonic dichloride (49 g.) was added slowly with stirring to a solution of allylalcohol (29 g.) and pyridine (40 g.) in ether (250 ml.) cooled to 0° C. The rate of addition was such that the temperature of the mixture remained at 0° C. Stirring was continued for 2 hours after complete addition. The reaction product was filtered to remove pyridine hydrochloride and the residue washed with 200 ml. ether. The ether was evaporated from the filtrate and the residue distilled to give diallyl phenyl phosphonate, B.P. 112° C./0.3 mm. Hg.

To the solution of diallyl phenyl phosphonate (5.9 g.) and lauryl methacrylate (25.4 g.) in mineral oil (15.5 g.) at 140° C., ditert- butyl peroxide (0.4 ml.) was added and the whole stirred vigorously. The solution was maintained under these conditions for 5 hours. The product had a molar ratio of 1:4 diallyl phenyl phosphonate to lauryl methacrylate and was a 66.7% concentrate in mineral oil. This concentrate was readily soluble in further samples of mineral oil.

EXAMPLE IV

To a solution of allyl alcohol (135 g.) and pyridine (168 g.) in diethyl ether (2000 ml.) phenyl phosphonous dichloride was added slowly with stirring. The rate of addition was adjusted to maintain a gentle reflux. Stirring and refluxing were continued for a further two hours after complete addition. Pyridine hydrochloride was filtered off and the residue washed with more ether (500 ml.). The ether was evaporated from the filtrate and the product distilled, the bulk of the material (allyl phenyl allylphosphinate) boiling at 102° C./0.4 mm. Hg. Small amounts of diallyl phenylphosphonite are separated during the distillation, B.P. 79° C./0.4 mm. Hg.

To a solution of allyl phenyl allylphosphinate (6 g.) and lauryl methacrylate (28 g.) in mineral oil (68 g.) at 140°–5° C. di-tert-butyl peroxide (0.4 ml.) was added and the whole stirred vigorously for 24 hours. The product was heated at 100° C./0.5 mm. Hg for 30 minutes but no distillate was obtained. This product had a 1:4 molar ratio of allyl phenyl allylphosphinate to lauryl methacrylate and was a 33.3% concentrate in mineral oil.

EXAMPLE V 151.2 gm. of phosphorus trichloride was added to a solution of 151.8 gm. of ethanol and 268 gm. of pyridine in 151.8 gm. of a petroleum ether boiling at 60–80° C., over a period of two hours. The temperature was maintained at 0–5° C. by a Cardice/IPA cooling bath. The reaction mixture was stirred for a further hour after complete addition, during this time the mixture was allowed to warm to room temperature. The product was filtered to remove pyridine hydrochloride and the solvent and phosphorus trichloride were then stripped from the filtrate. The residue was distilled to give triethyl phosphite.

121 gm. of allyl bromide containing a small quantity of hydroquinone was refluxed in a 50 ml. flask under a 10 inch column packed with glass beads, 140 gms. of triethylphosphite was added starting at a rate which maintained a steady reflux. Material boiling at 37–39° C. was run off from a weir head at the top of the column. After 8 hours, no more low boiling material remained and the reaction mixture was distilled to produce diethyl allylphosphonate.

133.5 gms. of diethyl allylphosphonate, 190.5 gms. lauryl methacrylate, 445 gms. of a SAE 10W30 grade mineral oil and 7.5 gms. of di-tert-butyl peroxide were mixed and stirred together at 145° C. After ½ hour a further quantity of 190.5 gms. laurylmethacrylate was added, this was repeated after 2 hours and again after 4 hours. This product was then stirred for a further 90 minutes. The mixture was then stripped at 140° C. and 0.15 mm. Hg pressure and a residue consisting of a 66.6% concentrate of a copolymer of diethyl allylphosphonate and lauryl methacrylate in a molar ratio of 1:8 in the mineral oil was recovered.

EXAMPLE VI 557 gms. of allyl alcohol, 724 gms. of pyridine and 500 mls. of sodium dried toluene were stirred at 0–5° C. 413 gms. of phosphorus trichloride in 100 mls. of sodium dried toluene was then added whilst maintaining the temperature of 0–5° C. The product was stirred for ½ hour and then the amine hydrochloride was filtered off. The toluene was then stripped off leaving triallyl phosphite.

48 gms. of n-butyl bromide containing a small amount of hydroquinone was heated to reflux in a vessel fitted with a column packed with glass beads surmounted by a weir head. 220 gms. of triallyl phosphite was added and refluxing continued for 20 hours and material boiling below 97° C. was removed. Excess butyl bromide was then distilled off and the residue comprised diallyl butylphosphonate. 109 gms. of diallyl butylphosphonate, 508 gms. of lauryl methacrylate, 927 gms. of an SAE 10W30 grade mineral oil and 7.6 gms. of di-tert-butyl peroxide were heated at 145° C. for 4 hours. The final product was a 40% wt. concentrate in the oil of a copolymer of diallyl butylphosphonate and lauryl methacrylate having a monomer ratio of 1:4.

EXAMPLE VII 127 g. of the triallyl phosphate prepared as in Example I, lauryl methacrylate (191 g.) and benzoyl peroxide (7 g.) in dry benzene (200 ml.) were stirred for 1 hour at 75° C. Lauryl methacrylate (400 g.) was added to the stirred mixture over 7 hours and stirring continued for 16 hours after completing the addition. The temperature remained at 75°–78° throughout. Most of the solvent was removed under reduced pressure and the viscous residue poured with vigorous stirring, into methanol (2000 ml.). The precipitated copolymer was washed with methanol by decanting and stripping of solvent under reduced pressure to yield a clear oil soluble copolymer (575 g.) of triallyl phosphate and lauryl methacrylate. Phosphorous content of copolymer: 1.08%, ratio of monomers 1:4.

The copolymers of the present invention are particularly useful as additives in lubricating compositions, and such compositions are a further feature of the present invention.

The lubricating oil to which the copolymers may be added to provide lubricating compositions of the invention can be any natural or synthetic oil having lubricating properties. Thus, the oil can be a hydrocarbon lubricating oil obtained from paraffinic or naphthenic crude or mixture thereof. The viscosity of these oils may vary over a wide range, such as from 100 SUS at 100° F. to 100 SUS at 210° F. The hydrocarbon lubricating oil may be blended with fatty oils such as castor oil or hard oil, and/or with synthetic lubricating oils such as polymerized olefins, copolymers of alkylene glycols and alkylene oxides, organic esters, e.g., di(2-ethyl hexyl)sebacate, dioctyl phthalate and trioctyl phosphate and polyalkyl silicone polymers such as dimethyl silicone polymers. If desired, the synthetic lubricating oils may be used as the sole base lubricating oil or admixed with fatty oils or derivatives thereof.

In the lubricating compositions of the present invention the polymeric additive is present in a minor proportion by weight based on the total composition, generally from 0.01% to 20% and preferably from 0.1% to 8% by weight.

It will be understood that the lubricating compositions of the invention may be modified by the addition thereto of minor proportions (0.1–2%) of other additives such as metal dithiophosphates, e.g., zinc di-2-ethylhexyl dithiophosphate, metal organic sulfonates, e.g., neutral or basic calcium, barium or zinc petroleum sulfonate; metal thiocarbamates, e.g., zinc, chromium or calcium dibutyl or diamyl dithiocarbamate; amines, e.g., phenyl-alpha-naphthylamine or octadecylamine; alkylated phenols and alkylated bisphenols, e.g., 2,6-dietertiary-butyl-4-methylphenol and 4,4'methylene bis(2,6-dietertiarybutyl phenol); organic sulfides, e.g., dibenzyldisulfide.

Lubricating compositions of the present invention are useful as engine oils, gear oils, turbine oils and in various other fields of lubrication where good detergency, viscosity/temperature characteristics and load carrying properties are essential.

Compositions of this invention are illustrated by the following formulations; the ratios in brackets being the mole ratios of the monomers used for preparing the copolymers. The mineral lubricating oil used is an oil having a viscosity of 10 cs. at 210° F.

*Composition A*

Copolymer of diallyl hydrogen phosphate/lauryl
  methacrylate (1:6) _____ 4% wt.
Mineral oil _____ Balance

*Composition B*

Copolymer of diallyl hydrogen phosphate/lauryl
  methacrylate (1:8) _____ 4% wt.
Mineral oil _____ Balance

*Composition C*

Copolymer of diallyl phenyl phosphine oxide/
  lauryl methacrylate (1:4) _____ 3.5% wt.
Mineral oil _____ Balance

*Composition D*

Copolymer of the allyl ester of phenylallyl
  phosphinic acid/lauryl methacrylate (1:4) _ 2.0% wt.
4,4'-methylene-bis(2,6-di-tert.butyl phenol) __ 0.75% wt.
Mineral oil _____ Balance

Composition E

Copolymer diallyl phenyl phosphonate/lauryl
 methacrylate (1:4) _____ 6.8% wt.
Mineral oil _____ Balance

Composition F

Copolymer of diallyl phenyl phosphine oxide/
 lauryl methacrylate (1:4) _____ 3.9% wt.
4,4'-methylene-bis(2,6-ditertiarybutyl phenol) 0.75% wt.
Mineral oil _____ Balance

Composition G

Copolymer of diethyl allyl phosphonate/lauryl methacrylate (1:8) _____ 2% wt.
4,4'-methylene-bis(2,6-ditert.butyl phenol) __ 0.75% wt.
Mineral oil _____ Balance

Composition H

Copolymer of diallyl butyl phosphonate/lauryl methacrylate (1:4) _____ 2% wt.
4,4'-methylene-bis(2,6-ditert.butyl phenol) __ 0.75% wt.
Mineral oil _____ Balance

Composition I

Copolymer of triallyl phosphate/lauryl methacrylate (1:4) _____ 2% wt.
4,4'-methylene-bis(2,6-ditert.butyl phenol)__ 0.75% wt.
Mineral oil _____ Balance In order to illustrate the properties of lubricating compositions and the utility of copolymers according to the present invention, certain compositions were subjected to tests in the following manner.

The thickening ability of the copolymers used as additives in the present invention was assessed in terms of the VT coefficient, calculated from the formula:

$$VT = \frac{\frac{\eta_{blend}^{210°F.} - \eta_{base\ oil}^{210°F.}}{\eta_{base\ oil}^{210°F.}}}{\frac{\eta_{blend}^{100°F.} - \eta_{base\ oil}^{100°F.}}{\eta_{base\ oil}^{100°F.}}} \times 100$$

where $\eta$ is the viscosity.

Various copolymers were added to a base mineral lubricating oil having a viscosity of 10 cs. at 210° F. and the VI values determined from the above equation. The results are contained in Table I.

TABLE I

| Copolymer | Concentration; percent wt. | VT |
|---|---|---|
| Diallyl hydrogen phosphate/lauryl methacrylate (1:6) | 4 | 109 |
| Allyl ester of phenyl allyl phosphinic acid/lauryl methacrylate (1:4) | 4.1 | 117 |
| Diallyl phenyl phosphine oxide/lauryl methacrylate (1:4) | 2 | 109 |

These figures represent good thickening properties.

The dispersant properties of various compositions were illustrated in the following manner.

1 part by weight of used straight mineral oil from a diesel engine and containing about 2% w. of oil-insolubles was mixed with 5 parts of the unused mineral oid of Compositions A–I. In this blend the insoluble particles were clustered. Other blends were made containing, as before ⅙ of used oil, and the remaining ⅚ a series of increasing concentrations of one of the additives in the unused mineral oil. At a particular concentration the insoluble particles become dispersed, and this concentration is taken as a measure of the dispersancy of the additive, i.e., the lower the concentration, the better are the dispersance characteristics. Some results are given in Table II.

TABLE II

| Copolymer | Concn. of Copolymer required to disperse clusters in mg. per g. blend |
|---|---|
| Diallyl phosphate/lauryl methacrylate (1:6) | 0.4 |
| Diallyl phenyl phosphine oxide/lauryl methacrylate (1:4) | 0.3 |
| Diethyl allylphosphonate/lauryl methacrylate (1:4) | 0.8 |
| Triallyl phosphate/lauryl methacrylate (1:4) | 1.7 |
| Diethyl allylphosphonate/lauryl methacrylate (1:8) | 0.67 |
| Diallyl phosphonate/lauryl methacrylate (1:4) | 1.0 |
| Dibutyl allyl phosphine oxide/lauryl methacrylate (1:4) | 0.4 |
| A mixture of diallyl butylphosphonate and diallyl phosphate in 9:1 molar ratio/lauryl methacrylate (1:4) | 0.67 |
| A mixture of diallyl butylphosphonate and diallyl phosphate in 4:1 molar ratio/lauryl methacrylate (1:4) | 0.67 |

Compositions D, F, G, H and I exhibited good low temperature performance properties when used in an automotive engine as is evidenced by absence of sludge deposition in the sump. Further, Compositions F and H were submitted to an anti-scuffing test in an automotive engine in which the cam wear and degree of tappet scuffing is indicative of the load carrying capacity of the oil. Compared with a similar formulation, but in which the copolymer according to the invention is replaced by 4% wt. of a copolymer of laurylmethacrylate and vinyl pyrrolidone, composition F exhibits a 60% reduction in the amount of tappet scuffing and an 83% reduction in cam wear and Composition H exhibits a 50% reduction in the amount of tappet scuffing and a 90% reduction in cam wear. Also, Compositions A and D, when subjected to a test for extreme pressure properties on the 4-ball machine, exhibited 2½ second seizure delay loads of 137 kg. and 92 kg. respectively compared with 65 kg. for the base oil.

I claim as my invention:

1. A mineral lubricating oil composition comprising a major amount of mineral lubricating oil and from about 0.01% to about 20% of an oil-soluble copolymer of triallyl phosphate and $C_{8-20}$ alkyl methacrylate, in the mol ratio of 1:20 to 20:1, respectively, said copolymer having molecular weight of from about 50,000 to 1,000,000.

2. A mineral lubricating oil composition comprising a major amount of mineral lubricating oil and from about 0.01% to about 20% of an oil-soluble copolymer of triallyl phosphate and laudyl methacrylate in the mol ratio of 1:20 to 20:1, respectively, said copolymer having a molecular weight of from about 50,000 to 1,000,000.

References Cited by the Examiner

UNITED STATES PATENTS

| | | | |
|---|---|---|---|
| 2,577,796 | 12/51 | Morris et al. | 252—49.8 |
| 2,659,714 | 11/53 | Harman et al. | 260—86.1 |
| 2,694,684 | 11/54 | Rogers et al. | 252—49.8 |
| 2,711,403 | 6/55 | Stiles et al. | 260—86.1 |
| 2,863,834 | 12/58 | Buckmann | 252—32.5 |
| 2,867,610 | 1/59 | Fon Toy et al. | 260—78.5 |
| 2,940,961 | 6/60 | Coover et al. | 260—85.5 |
| 2,956,952 | 10/60 | FitzGerald | 252—49.9 |

DANIEL E. WYMAN, *Primary Examiner.*

JULIUS GREENWALD, *Examiner.*